United States Patent
Dawson et al.

(10) Patent No.: US 8,903,968 B2
(45) Date of Patent: Dec. 2, 2014

(54) DISTRIBUTED COMPUTING ENVIRONMENT

(75) Inventors: Christopher J. Dawson, Arlington, VA (US); Craig W. Fellenstein, Brookfield, CT (US); Vincenzo V. Di Luoffo, Sandy Hook, DC (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 11/468,106

(22) Filed: Aug. 29, 2006

(65) Prior Publication Data

US 2008/0059554 A1 Mar. 6, 2008

(51) Int. Cl.
*H04L 29/08* (2006.01)
*H04L 12/24* (2006.01)

(52) U.S. Cl.
CPC ............ *H04L 67/10* (2013.01); *G06F 15/1733* (2013.01); *H04L 67/1008* (2013.01); *H04L 67/101* (2013.01); *H04L 41/0233* (2013.01); *H04L 41/046* (2013.01)
USPC ........... 709/223; 709/207; 709/225; 709/229; 709/235; 713/502; 726/27

(58) Field of Classification Search
CPC .......... G06F 15/173; G06F 2209/5022; G06F 2201/81; G06F 2209/5021; G06F 2206/1506; H04L 43/16; H04L 67/1008; H04L 67/10; H04L 67/101; H04M 17/222; H04N 1/00769
USPC .......... 709/223, 207, 225, 229, 235; 713/502; 726/27
See application file for complete search history.

(56) References Cited

U.S. PATENT DOCUMENTS

| | | | | |
|---|---|---|---|---|
| 4,328,397 A | * | 5/1982 | Chamberlin | 379/75 |
| 4,547,847 A | * | 10/1985 | Olig et al. | 700/52 |
| 5,202,987 A | * | 4/1993 | Bayer et al. | 718/102 |
| 5,392,052 A | * | 2/1995 | Eberwine | 342/357.55 |
| 5,440,741 A | * | 8/1995 | Morales et al. | 718/103 |
| 5,526,517 A | * | 6/1996 | Jones et al. | 707/999.008 |
| 5,617,001 A | * | 4/1997 | Nacewicz et al. | 318/788 |
| 5,794,011 A | * | 8/1998 | Paul et al. | 703/22 |
| 5,828,902 A | * | 10/1998 | Tanaka et al. | 710/39 |
| 6,047,323 A | | 4/2000 | Krause | |
| 6,064,677 A | * | 5/2000 | Kappler et al. | 370/395.43 |
| 6,091,709 A | * | 7/2000 | Harrison et al. | 370/235 |
| 6,504,845 B1 | * | 1/2003 | Petersen et al. | 370/412 |
| 6,516,350 B1 | | 2/2003 | Lumelsky et al. | |
| 6,542,950 B1 | * | 4/2003 | Bodnar | 710/260 |
| 6,570,867 B1 | | 5/2003 | Robinson et al. | |
| 6,625,161 B1 | * | 9/2003 | Su et al. | 370/415 |
| 6,646,595 B1 | * | 11/2003 | Heng et al. | 342/357.06 |
| 6,880,086 B2 | * | 4/2005 | Kidder et al. | 713/191 |
| 6,993,453 B2 | | 1/2006 | Krissell | |
| 7,051,330 B1 | | 5/2006 | Kaler et al. | |
| 7,073,005 B1 | | 7/2006 | Basu et al. | |
| 7,099,329 B1 | * | 8/2006 | Choudhury et al. | 370/395.2 |

(Continued)

OTHER PUBLICATIONS

Emdadi, K.; Non-Final Office Action; Dec. 30, 2008; U.S. Appl. No. 11/468,000; USPTO.

(Continued)

*Primary Examiner* — Ondrej C. Vostal
(74) *Attorney, Agent, or Firm* — Robert C. Rolnik (57) ABSTRACT

A distributed computing environment for executing applications in a degraded state during constrained resource availability.

12 Claims, 9 Drawing Sheets

(56) References Cited

U.S. PATENT DOCUMENTS

| | | | |
|---|---|---|---|
| 7,165,252 B1 * | 1/2007 | Xu | 718/102 |
| 7,185,237 B2 * | 2/2007 | Stephenson et al. | 714/47.2 |
| 7,243,351 B2 * | 7/2007 | Kundu | 718/102 |
| 7,243,352 B2 * | 7/2007 | Mandava et al. | 718/104 |
| 7,246,156 B2 * | 7/2007 | Ginter et al. | 709/217 |
| 7,302,691 B2 | 11/2007 | Masri et al. | |
| 7,321,945 B2 * | 1/2008 | Kataoka | 710/260 |
| 7,415,477 B2 * | 8/2008 | Devadas et al. | 1/1 |
| 7,548,547 B2 * | 6/2009 | Patwardhan et al. | 370/418 |
| 7,626,994 B2 * | 12/2009 | Bennett | 370/419 |
| 7,869,794 B1 * | 1/2011 | Weaver | 455/412.1 |
| 7,934,020 B1 * | 4/2011 | Xu et al. | 709/250 |
| 7,974,955 B2 * | 7/2011 | Barsness et al. | 707/687 |
| 8,233,392 B2 * | 7/2012 | Samuels et al. | 370/235 |
| 8,417,814 B1 * | 4/2013 | Hartmann | 709/225 |
| 2002/0019844 A1 | 2/2002 | Kurowski et al. | |
| 2002/0154605 A1 * | 10/2002 | Preston et al. | 370/254 |
| 2002/0165961 A1 * | 11/2002 | Everdell et al. | 709/225 |
| 2003/0037117 A1 | 2/2003 | Tabuchi | |
| 2003/0081624 A1 * | 5/2003 | Aggarwal et al. | 370/412 |
| 2003/0135639 A1 * | 7/2003 | Marejka et al. | 709/232 |
| 2003/0149864 A1 * | 8/2003 | Furukawa et al. | 712/228 |
| 2003/0156547 A1 * | 8/2003 | Peleg | 370/252 |
| 2003/0195983 A1 * | 10/2003 | Krause | 709/238 |
| 2003/0227926 A1 * | 12/2003 | Ramamurthy et al. | 370/395.42 |
| 2004/0031030 A1 * | 2/2004 | Kidder et al. | 717/172 |
| 2004/0039520 A1 * | 2/2004 | Khavakh et al. | 701/201 |
| 2004/0043394 A1 * | 3/2004 | Ohkawa | 435/6 |
| 2004/0103338 A1 | 5/2004 | Chalasani et al. | |
| 2004/0117427 A1 * | 6/2004 | Allen et al. | 709/200 |
| 2004/0190183 A1 * | 9/2004 | Tamai et al. | 360/69 |
| 2004/0208126 A1 * | 10/2004 | Wassew et al. | 370/235 |
| 2005/0021594 A1 | 1/2005 | Bernardin et al. | |
| 2005/0027863 A1 | 2/2005 | Talwar et al. | |
| 2005/0034130 A1 | 2/2005 | Skovira | |
| 2005/0050299 A1 | 3/2005 | Joseph | |
| 2005/0074007 A1 * | 4/2005 | Samuels et al. | 370/392 |
| 2005/0081211 A1 * | 4/2005 | Koga et al. | 718/105 |
| 2005/0131898 A1 | 6/2005 | Fatula, Jr. | |
| 2005/0131993 A1 | 6/2005 | Fatula, Jr. | |
| 2005/0138111 A1 * | 6/2005 | Aton et al. | 709/201 |
| 2005/0155033 A1 | 7/2005 | Luoffo et al. | |
| 2005/0160318 A1 | 7/2005 | Di Luoffo et al. | |
| 2005/0188088 A1 | 8/2005 | Fellenstein et al. | |
| 2005/0262506 A1 | 11/2005 | Dawson et al. | |
| 2006/0005074 A1 * | 1/2006 | Yanai et al. | 714/5 |
| 2006/0005181 A1 | 1/2006 | Fellenstein et al. | |
| 2006/0018323 A1 * | 1/2006 | Kempe | 370/395.21 |
| 2006/0039287 A1 * | 2/2006 | Hasegawa et al. | 370/238 |
| 2006/0123421 A1 * | 6/2006 | Loboz | 718/105 |
| 2006/0161920 A1 * | 7/2006 | An et al. | 718/102 |
| 2006/0221925 A1 * | 10/2006 | Beathard | 370/342 |
| 2006/0224740 A1 * | 10/2006 | Sievers-Tostes et al. | 709/226 |
| 2006/0277413 A1 * | 12/2006 | Drews | 713/189 |
| 2008/0052716 A1 * | 2/2008 | Theurer | 718/103 |
| 2008/0208949 A1 * | 8/2008 | Tanaka et al. | 709/201 |
| 2008/0307425 A1 * | 12/2008 | Tripathi | 718/104 |
| 2010/0241759 A1 | 9/2010 | Smith et al. | 709/233 |

OTHER PUBLICATIONS

Emdadi, K.; Final Office Action; Aug. 26, 2009; U.S. Appl. No. 11/468,000; USPTO.

* cited by examiner

DISTRIBUTED COMPUTING ENVIRONMENT

BACKGROUND

1. Technical Field of the Present Invention

The present invention generally relates to distributed computing and, more specifically, to methods, apparatuses, and computer program products that manage the execution of tasks on the resources of the distributed computing environment.

2. Description of Related Art

The evolution of using multiple computers to share and process information began the first time two computers were connected together and has continued through the birth of various forms of networks such as clustering and grid computing.

The framework of grid computing is large scale organization and sharing of resources (where the resources can exist in multiple management domains) to promote the use of highly parallelized applications that are connected together through a communications medium in order to simultaneously perform one or more job requests. The characteristics of each resource can include, for example, processing speed, storage capability, licensing rights, and types of applications available.

The use of grid computing to handle all types of tasks has several distinct advantages. One such advantage is that it efficiently uses the grouped resources so that under-utilization is minimized. For example, assume that a vendor suddenly encounters a 75% increase in traffic for orders being placed as a result of a blockbuster product. If a traditional system were used in this example, the customer would experience latent response and completion time, bottleneck in processing, and the system could even overload its resources due to its limited or fixed computational and communication resources.

Presented with the same situation, grid computing can dynamically adjust to meet the changing business needs, and respond instantly to the increase in traffic using its network of available resources. More specifically, as the traffic increased, the instantiations of the applications responsible for receiving and processing the orders could be executed on under-utilized resources so that the customer would not experience any latency as a result of the increase in traffic.

Another advantage is that grid computing provides the ability to share resources such as hardware, software, and services, as virtual resources. These virtual resources provide uniform interoperability between heterogeneous grid participants. Each grid resource may have certain features, functionalities and limitations. For example, a particular job may require an SQL server as compared to Oracle server. So, the grid computing architecture selects or creates a resource that is capable of supporting this particular requirement.

The ability to efficiently use the resources of the grid computing architecture is a primary concern. In fact, the sharing of the resources of the grid is built upon this very principal. Unfortunately, current applications that are created for grid computing are designed so as to expect that all of their modules will be required for execution in order to accomplish an intended task or purpose. The reality is that some of the functionality of these applications is not required in order to achieve the underlying purpose or task. As the resources of the grid environment become constrained or otherwise restricted, the 100 percent execution requirement of these applications becomes a limiting factor in the number of applications running and the times associated with providing the end results.

It would, therefore, be a distinct advantage if an application could be designed so as to identify those modules or portions that are required to achieve an underlying task ("critical") and those modules whose execution is optional ("non-critical"). It would be further advantageous if the software and/or hardware managing the resources of the grid had knowledge concerning the critical and non-critical modules for each of the applications executing on the grid. When resources of the grid become constrained or otherwise unavailable, the hardware/software can make intelligent decisions concerning whether existing or new applications can operate in a degraded state (i.e., only critical modules are executed).

SUMMARY OF THE PRESENT INVENTION

In one aspect, the present invention is a method of executing an application in a distributed computing environment having a plurality of resources. The method includes the step of receiving a job request from a client system specifying the execution of an application on the distributed computing environment. The method also includes the step of retrieving, in response to the job request, a description of the modules of the application that identifies critical modules that must be executed in order to achieve a primary purpose of the application and non-critical modules. The method further includes the step of providing the code for each one of the critical modules to resources as they become available prior to providing the code for any of the non-critical modules

BRIEF DESCRIPTION OF THE DRAWINGS

The present invention will be better understood and its advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

The present invention is a method, apparatus and computer program product for managing and assigning tasks for the resources of a distributed computing environment. Each of the applications executing on the distributed computing environment have a profile that identifies modules as critical or non-critical. As the resources of the distributed computing environment become constrained or otherwise unavailable, the present invention examines the profiles of the executing and new applications (i.e., requested for execution by a pending task) to determine whether these applications can operate in a degraded state so that maximum throughput is achieved.

Figure 1:
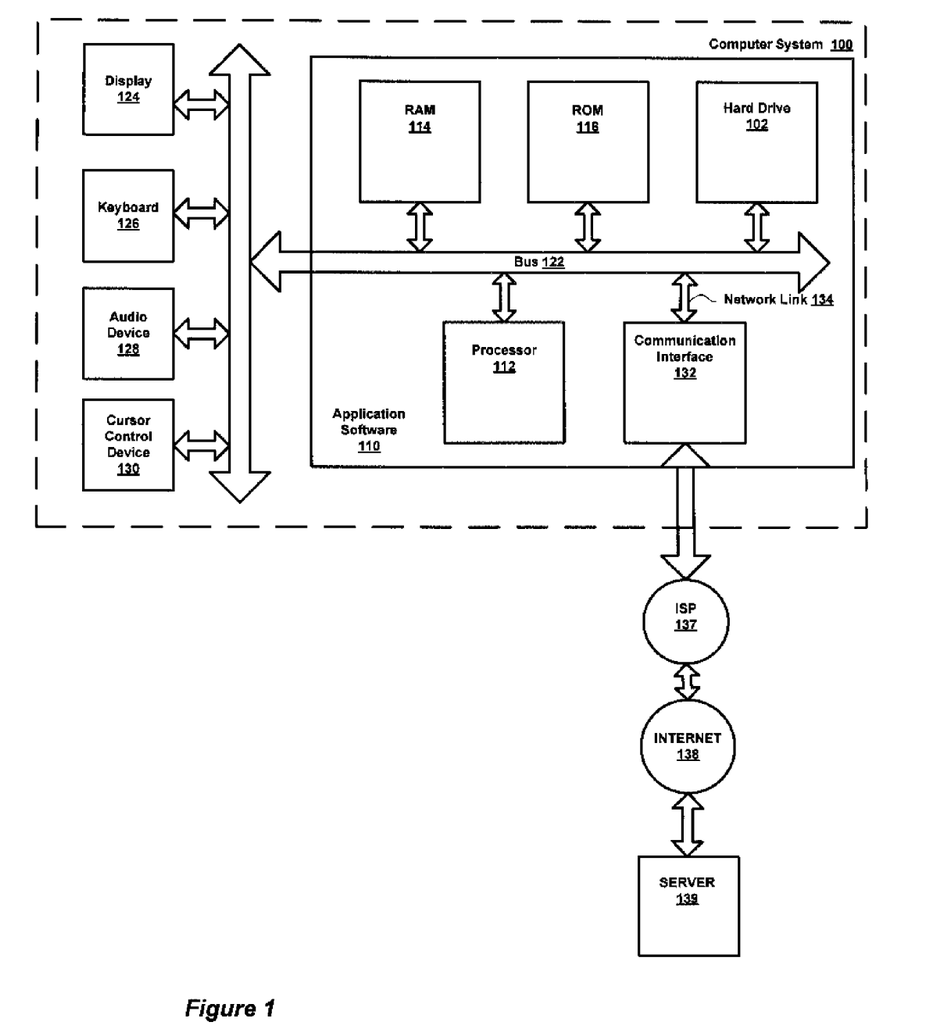
FIG. 1 is a block diagram illustrating a computer system that can be used to implement an embodiment of the present invention.

Reference now being made to FIG. 1, a block diagram is shown illustrating a computer system 100 that can implement an embodiment of the present invention. Computer System 100 includes various components each of which are explained in greater detail below.

Bus 122 represents any type of device capable of providing communication of information within Computer System 100 (e.g., System bus, PCI bus, cross-bar switch, etc.)

Processor 112 can be a general-purpose processor (e.g., the PowerPC™ manufactured by IBM or the Pentium™ manufactured by Intel) that, during normal operation, processes data under the control of an operating system and application software 110 stored in a dynamic storage device such as Random Access Memory (RAM) 114 and a static storage device such as Read Only Memory (ROM) 116. The operating system preferably provides a graphical user interface (GUI) to the user.

The present invention, including the alternative preferred embodiments, can be provided as a computer program product, included on a machine-readable medium having stored on it machine executable instructions used to program computer system 100 to perform a process according to the teachings of the present invention.

The term "machine-readable medium" as used in the specification includes any medium that participates in providing instructions to processor 112 or other components of computer system 100 for execution. Such a medium can take many forms including, but not limited to, non-volatile media. Common forms of non-volatile media include, for example, a floppy disk, a flexible disk, a hard disk, magnetic tape, or any other magnetic medium, a Compact Disk ROM (CD-ROM), a Digital Video Disk-ROM (DVD-ROM) or any other optical medium whether static or re-writeable (e.g., CDRW and DVD RW), punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the preferred embodiment, an example of a non-volatile medium is the Hard Drive 102.

Volatile media includes dynamic memory such as RAM 114. Transmission media includes coaxial cables, copper wire or fiber optics, including the wires that comprise the bus 122. Transmission media can also take the form of acoustic or light waves, such as those generated during radio wave or infrared data communications.

Moreover, the present invention can be downloaded as a computer program product where the program instructions can be transferred from a remote computer such as server 139 to requesting computer system 100 by way of data signals embodied in a carrier wave or other propagation medium via network link 134 (e.g., a modem or network connection) to a communications interface 132 coupled to bus 122.

Communications interface 132 provides a two-way data communications coupling to network link 134 that can be connected, for example, to a Local Area Network (LAN), Wide Area Network (WAN), or as shown, directly to an Internet Service Provider (ISP) 137. In particular, network link 134 may provide wired and/or wireless network communications to one or more networks.

ISP 137 in turn provides data communication services through the Internet 138 or other network. Internet 138 may refer to the worldwide collection of networks and gateways that use a particular protocol, such as Transmission Control Protocol (TCP) and Internet Protocol (IP), to communicate with one another. ISP 137 and Internet 138 both use electrical, electromagnetic, or optical signals that carry digital or analog data streams. The signals through the various networks and the signals on network link 134 and through communication interface 132, which carry the digital or analog data to and from computer system 100, are exemplary forms of carrier waves transporting the information.

In addition, multiple peripheral components can be added to computer system 100. For example, audio device 128 is attached to bus 122 for controlling audio output. A display 124 is also attached to bus 122 for providing visual, tactile or other graphical representation formats. Display 124 can include both non-transparent surfaces, such as monitors, and transparent surfaces, such as headset sunglasses or vehicle windshield displays.

A keyboard 126 and cursor control device 130, such as mouse, trackball, or cursor direction keys, are coupled to bus 122 as interfaces for user inputs to computer system 100.

The application software 110 can be an operating system or any level of software capable of executing on computer system 100.

Figure 2:
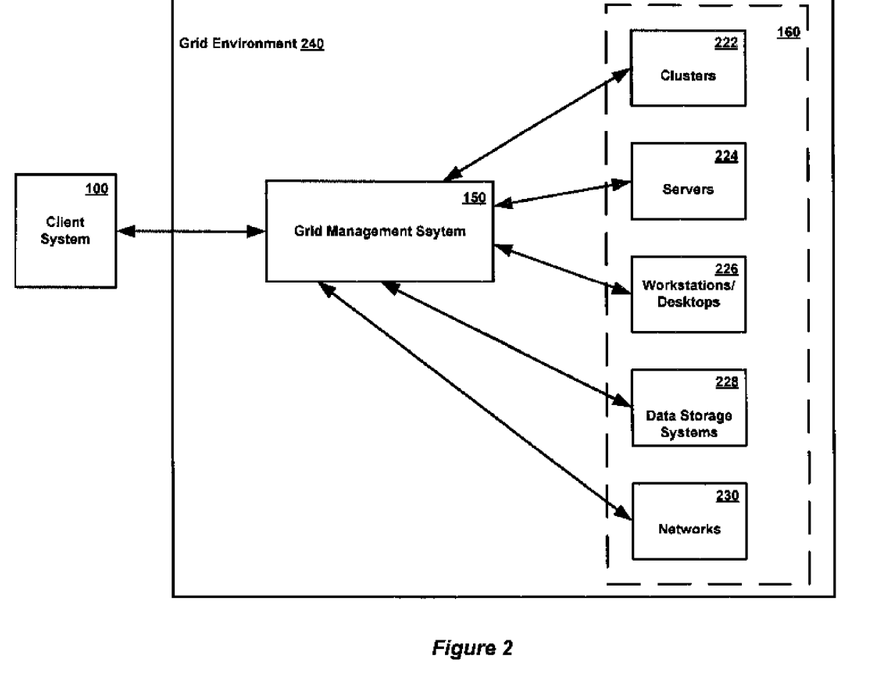
FIG. 2 is a diagram illustrating an example of a grid environment being used in conjunction with the client system 100 of FIG. 1.

Reference now being made to FIG. 2, a diagram is shown illustrating an example of a grid environment being used in conjunction with the client system 100 of FIG. 1. Grid environment 240 includes a grid management system 150 and a virtual resource 160.

Virtual resource 160 represents a multitude of hardware and software resources. For ease of explanation, virtual resource 160 has been illustrated as having server clusters 222, servers 224, workstations and desktops 226, data storage systems 228, and networks 230 (hereinafter referred to as "components"). It should be noted, however, that the types and number of hardware and software resources can be numerous.

In addition, the various networks and connections between the components have not been shown in order to simplify the discussion of the present invention. As such, it should be noted that each one of the components can reside on top of a network infrastructure architecture that can be implemented with multiple types of networks overlapping one another (e.g., multiple large enterprise systems, peer-to-peer systems, and single computer system). In other words, the components can be in a single system, multiple systems, or any combination thereof including the communication paths required to process any required information.

Furthermore, each of the components can also be heterogeneous and regionally distributed (local, across countries, or even continents) with independent management systems.

The grid management system 150 supports the grid environment 240 by implementing a grid service such as Open Grid Service Architecture (OGSA). The grid service can be a single type of service or multiple types of services such as computational grids, scavenging grids, and data grids. Grid management system 150 also manages job requests from client system 100 and others (not shown), and controls the distribution of the tasks created from each job request to a selection of the components of virtual resource 160 for execution.

In the present example, client system 100 is shown as residing outside the grid environment 240 while sending job requests to grid management system 150. Alternatively, client system 100 could also reside within the grid environment 240 and share resources while sending job requests and optionally processing assigned tasks. As the results are returned from the job request, the client system 100 is unaware of what particular components performed the required tasks to complete the job request.

Figure 3:
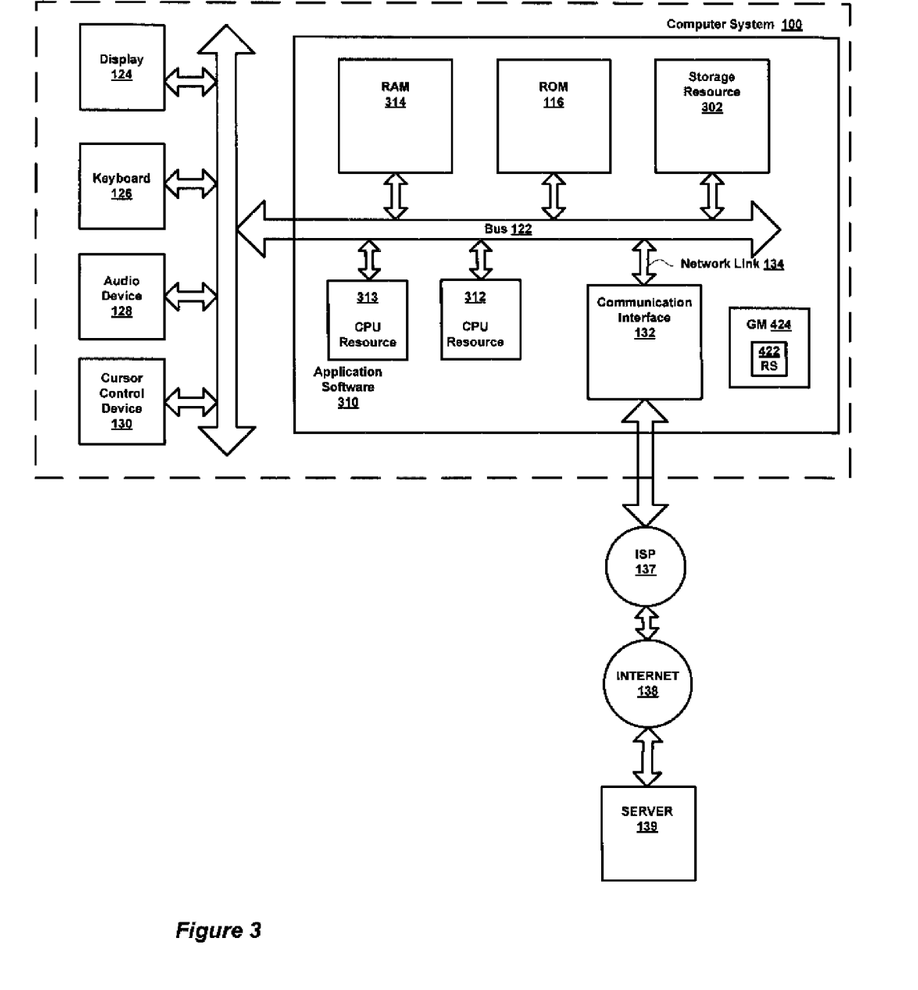
FIG. 3 is a diagram illustrating an example of how the grid management system of FIG. 2 views a workstation/desktop that has been integrated into the grid environment according to the teachings of the present invention.

Reference now being made to FIG. 3, a diagram is shown illustrating an example of how the grid management system 150 of FIG. 2 views a workstation/desktop 226 that has been integrated into the grid environment 240 according to the teachings of the present invention. Workstation/desktop 226 can be, for example, computer system 100 of FIG. 1.

When a computer system, such as computer system 100 is integrated into the grid environment 240 its hardware and software components become part of the components of the virtual resource 160 (FIG. 2). More specifically, the two processors 112-113, RAM 114, Hard Drive 102, and Application Software 110 are viewed by the grid management system 150 as CPU resources 313-314, Memory resource 314, Storage resource 302, and Application resource 310. It should be noted that, although computer system 100 has been shown as an example, the types and configurations of the resources of such a computer system 100 can be distributed across multiple computer systems connected by a network or other means. In other words, computer system 300 can be a single computer or components from multiple computers interconnected one to another.

The integration of computer system 100 also results in the incorporation of a portion of the grid management system 150 into the computer system 300 as represented by grid manager and router GM 424. GM 424 provides the interface between the resources of computer system 100 other GMs and the client systems sending the requests. A resource monitor 422 is part of this interface and monitors the status of each of the resources (312-313, 314, 302, and 310).

GM 424 preferably sends status reports to other GMs to indicate the availability of resources. The status reports can include, for example, a description of the computer hardware, operating system, and resources. These status reports can be generated each time a system joins or leaves the grid environment 240, a threshold is reached, at predetermined time interval has elapsed, a predetermined event occurs such as hardware fault or apportion of an application or service is failing.

Each of the components of the virtual resource 160 is managed by the grid management system using a grid architecture as explained in connection with FIG. 4.

Figure 4:
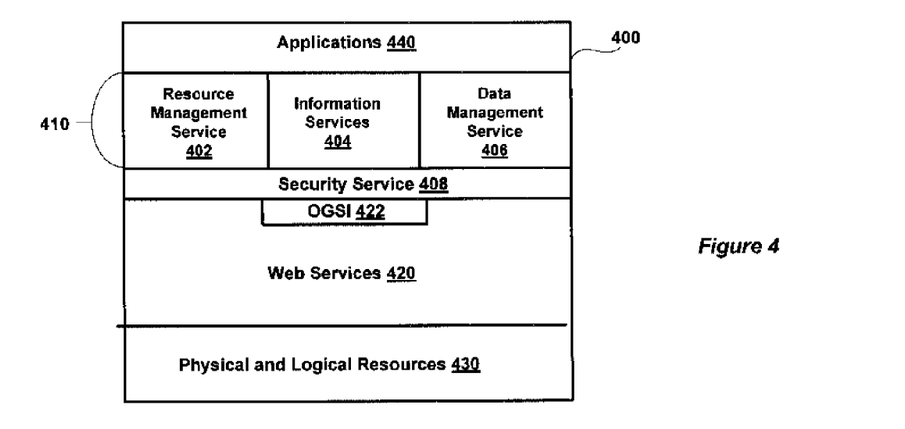
FIG. 4 is a block diagram illustrating an example of a grid architecture that implement the grid environment of FIG. 2.

Reference now being made to FIG. 4, a block diagram is shown illustrating an example of a grid architecture 400 that implement the grid environment 240 of FIG. 2. As shown, the grid architecture 400 includes physical and logical resources 430, web services 420, security service 408, grid services 410, and applications 440, layers. Grid architecture 400 is but one example of the various types of architectures that can be used by grid management system 150 to support grid environment 240 and is not to be considered a limitation on various aspects of the present invention, but rather, as a convenient manner in which to explain the present invention.

The physical and logical resources layer 430 organizes the physical and logical resources of grid environment 240. Physical resources typically include servers, storage media, networks and the like. Logical resources aggregate and create a virtual representation of the physical resources into usable resources such as operating systems, processing power, memory, I/O processing, file systems, database managers, directories, memory manages, and other resources.

Web services layer 420 is an interface between grid services layer 410 and the physical and logical resources layer 430. This interface can include, for example, Web Services Description Language (WSDL), Simple Object Access Protocol (SOAP), and eXtensible Mark-up Language (XML) executing on an Internet Protocol or other network transport layer.

The Open Grid Services Infrastructure (OSGI) is used to extend the web services layer 420 to provide dynamic and manageable web services in order to model the resources of the grid environment 240.

Security service 408 applies a security protocol for security at the connection layers of each of the systems, operating within the grid, such as OPEN Secure Socket Layers (SSL).

Grid services layer 410 includes security service 408, resource management service 402, information services 404, and data management service 406.

Resource management service 402 receives job requests and manages the processing of these requests by the physical and logical resources 430 and retrieval of any information resulting from the completion of these requests. The management includes monitoring the resource loads and distributing the job requests so as to maintain balance during non-peak and peak activity. The resource management service 402 also supports the ability to allow a user to specify a preferred level of performance and distribute job requests so as to maintain the specified performance levels.

Information services 404 facilitate the transfer of data between the various systems by translating one protocol to another when necessary.

Data management service 406 controls the transfer and storage of data within the grid environment 240 so that the data is available to the resource responsible for executing a particular job request.

Applications layer 440 represents applications that use one or more of the grid services supported by grid services layer 410. These applications interface with the physical and logical resources using the grid services layer 410 and web services 420 in order to support the interaction and operation of the various heterogeneous systems that exist within the grid environment 240.

A logical view of the grid environment is also useful in explaining the various operations that occur between the client system 100, general management system 150 and virtual resources 160 as illustrated and explained in connection with FIG. 5.

Figure 5:
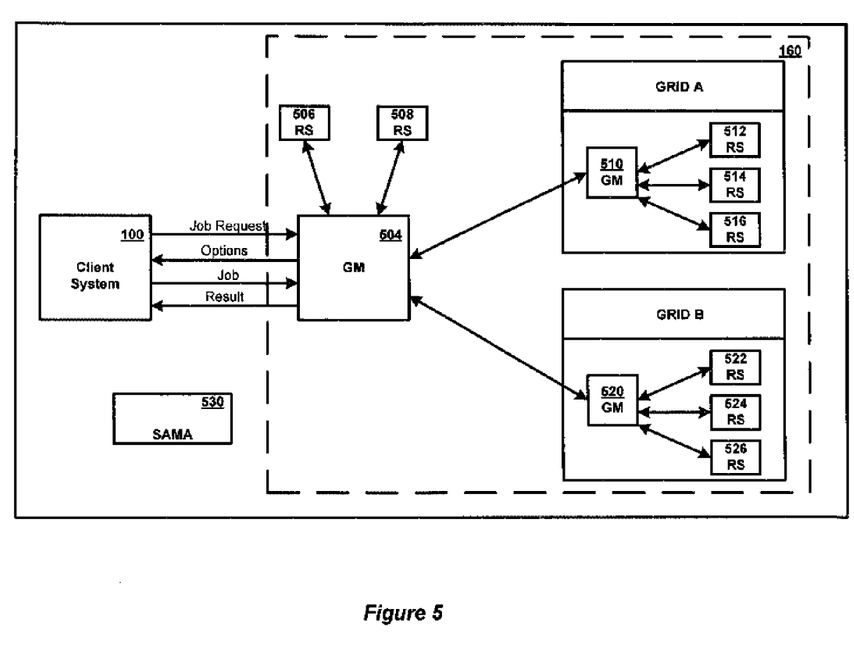
FIG. 5 is a diagram illustrating an example of a logical view of the grid environment of FIG. 2.

Reference now being made to FIG. 5, a diagram is shown illustrating an example of a logical view of the grid environment 240 of FIG. 2. Logically, the functionality of the grid management system 150 is dispersed into multiple General Management systems GMs (e.g., GMs 504, 510, and 520). In addition, the virtual resource 160 is also logically dispersed into multiple resources RSs (e.g., 506, 508, 512, 514, 516, 522, 524, and 526). In this view, a resource is not necessarily a direct representation of a physical resource but can be a logical representation of a group (two or more) of physical resources.

Grid A represents a grid infrastructure having GM 510, RS 512, 514 and 516. Grid B represents a grid infrastructure having GM 520, RS 522, 524 and 526. It can be assumed for the moment that grids A and B are operated by first and second business, respectively each having an associated price for specified processing grid services. It can also be assumed for the moment that RS 506 and 508 are resources that are local or within the same discrete set of resources to which jobs from client system 100 are submitted.

In this example, client system 100 sends a job request to GM 504. GM 504 searches for resources (506, 508, 512, 514, 516, 522, 524, and 526) that are available to handle the tasks required to complete the job request. In this instance, GM 504 checks whether RS 506 and/or RS 508 are able to process this job request and also sends similar queries to other GMs 510 and 520. GMs 510 and 520 return reports on the availability of their respective resources (512-516 and 522-526) and associated price to process the job request.

Client system 100 is able to review the reports and select one of the provided options according to the desires of the user. For example, client system 100 could select an option provided by GM 510 that would form a virtual organization to process the job request using GM 504, GM 510, RS 512 and 514.

In the preferred embodiment of the present invention, a Service Availability Management Agent (SAMA) 530 monitors grid resources, coordinates policies, manages application profiles, performs analytical processing, and is responsible for problem dispatch. In other words, SAMA 530 manages the resources of the grid environment 204 so that during times that these resources become degraded or otherwise restricted the applications and services continue to operate. Degradation can occur as a result of system failure, a network infrastructure dropping or becoming overloaded or other failures. During degradations of a particular resource, SAMA 530 can move an application or service from one resource to the next or allow an application to continue to operate a degraded fashion as explained below.

The application residing in application layer 440 are currently designed and written so as to expect 100 percent of their modules to execute on one or more resources. The management of the execution of these applications 440 has also been designed with this expectation as well. Some portions of these applications 440, however, are not absolutely required in order to complete the job request (i.e., non-critical).

If the management of the grid environment 240 had the ability to execute an application such that only the critical modules are used ("degraded state") then existing and new job requests could continue to be processed when the grid environment 240 becomes overloaded or has resource issues.

In the preferred embodiment of the present invention, applications 440 are designed so that they have both critical and non-critical modules. As the resources experience overload or otherwise become limited in their ability to execute all pending tasks, SAMA 530 can analyze an application to determine whether the user has specified that this application can operate in a degraded state (i.e., only the critical portions can be executed and the desired results can still be achieved) as explained below.

Figure 6:
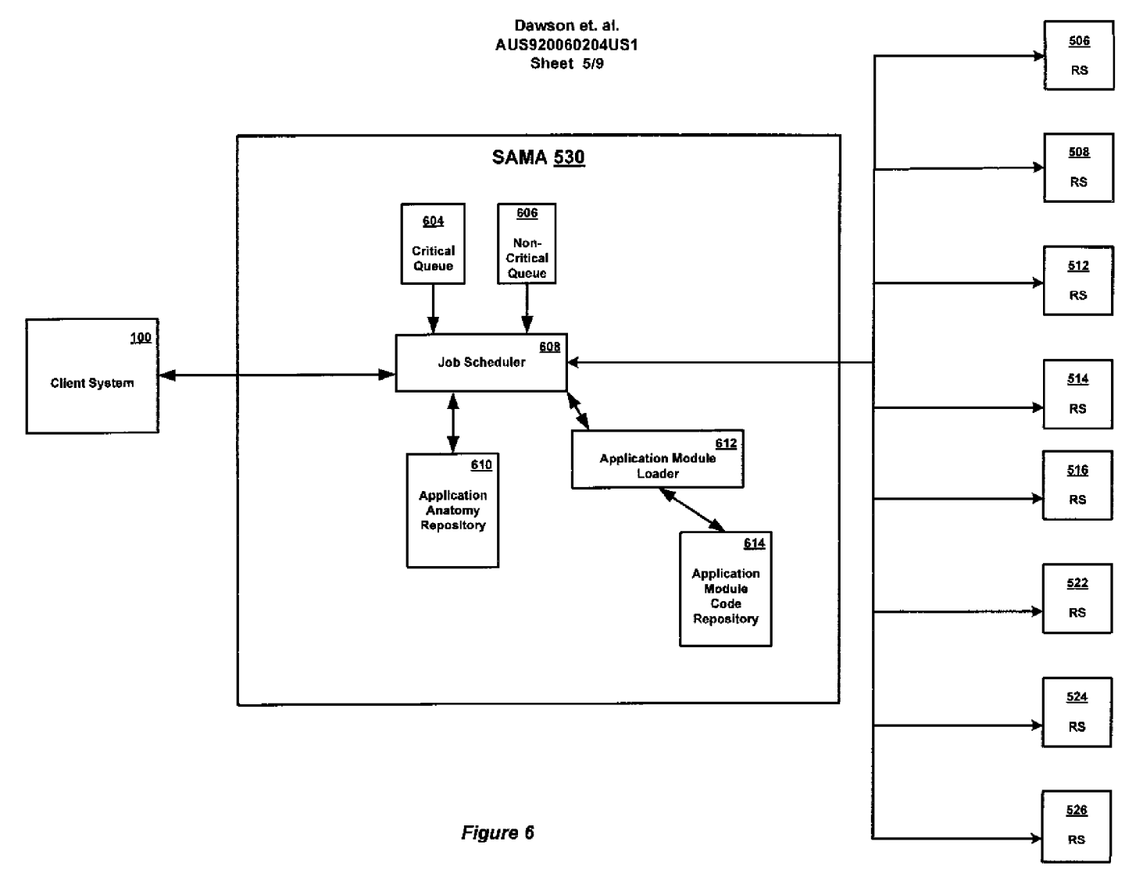
FIG. 6 is a block diagram illustrating in greater detail the various components of the SAMA of FIG. 5 according to the teachings of the present invention.

Reference now being made to FIG. 6, a block diagram is shown illustrating in greater detail the various components of the SAMA 530 of FIG. 5 according to the teachings of the present invention. SAMA 530 includes a job scheduler 608, critical and non-critical queues 604 and 606, respectively, application anatomy repository 610, application module loader 612, and application module code repository 614.

Application anatomy repository 610 stores an anatomy for each one of the applications 440 an example of which is illustrated and explained in connection with FIG. 7 below.

Figure 7:
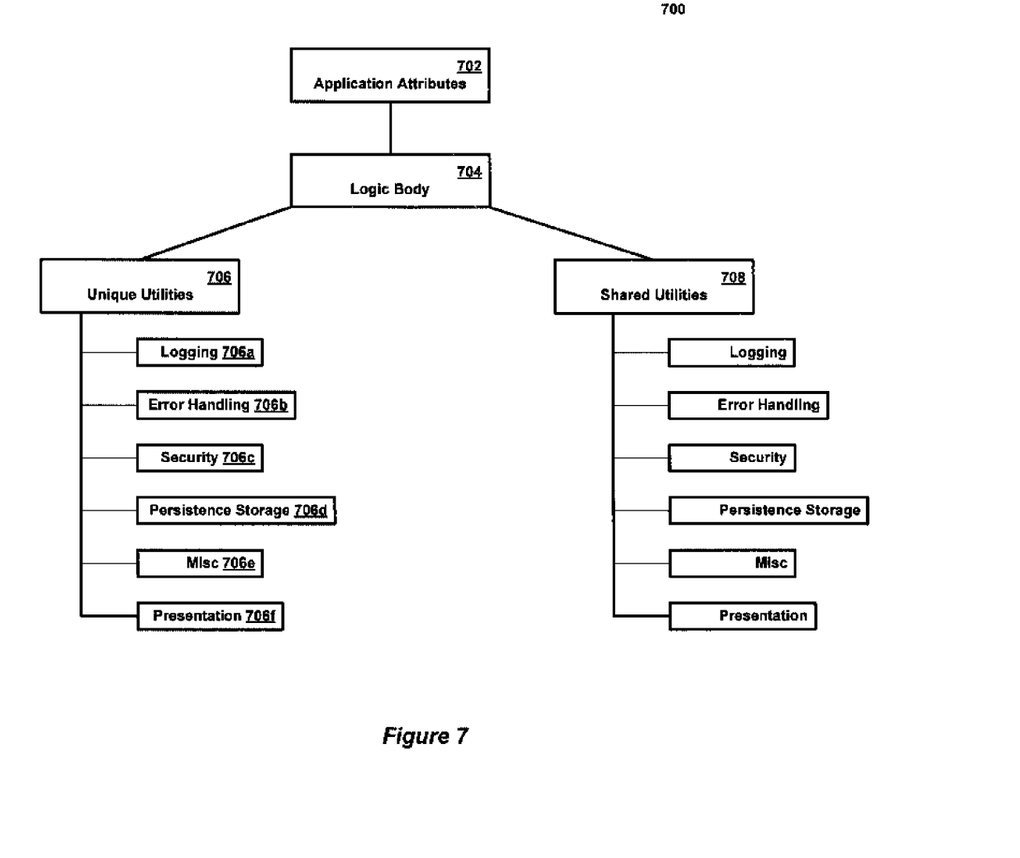
FIG. 7 is a diagram illustrating an example of an anatomy for one of the applications according to the teachings of the preferred embodiment of the present invention.

Reference now being made to FIG. 7, a diagram is shown illustrating an example of an anatomy 700 for one of the applications 440 according to the teachings of the preferred embodiment of the present invention. An application anatomy 700 is a tree similar in nature to that of object oriented programming and inheritance (i.e., multiple children of a parent node or multiple siblings with similar traits). In the preferred embodiment, the root node 702 identifies the application attributes. The logic body 704 represents the logical body of the inheritance that can be created using unique 706 or shared utilities 708.

As these attributes are inherited from the root node 702, the designer is provided with the capability to use existing ubiquitous utilities (shared) provided by the grid environment 240 or to create unique utilities 706 that are uniquely designed for the particular application 440.

These utilities 706 and 708 can include, for example, functionality such as logging 706a, error handling 706b, security 706c, persistence storage 706d, and presentation (user interface) 706f.

In general, each application profile contains a list of the modules/utilities each of which include an indication of whether they are critical or non-critical to the primary task supported by the application 440. Table 1 is an example of a Document Type Definition (DTD) of an XML expression how an application profile can appear.

TABLE 1

```
**************************************************************
Application Anatomy Profile DTD —Version 1.0
**************************************************************
    + : One or more permitted
    * : Zero or more permitted
    ? : Optional
**************************************************************
-->
<!-- Application Anatomy Profile Definition -->
<!ELEMENT Application (ApplicationAttr, Module*)>
<!ELEMENT ApplicationATTR EMPTY>
<!ATTLIST   ApplicationATTR
  Name CDATA #REQUIRED
  Version CDATA #REQUIRED
  Description CDATA #REQUIRED
  Developername DATA #REQUIRED
  OwnerName CDATA #REQUIRED
>
<!ELEMENT Module (Resource, Security*)>
<ATTLIST   Module
  ModuleName CDATA #REQUIRED
  ModuleVersion CDATA #REQUIRED
  ModuleId CDATA #REQUIRED
  DevloperName CDATA #REQUIRED
  OwnerName CDATA #REQUIRED
>
<!ELEMENT Resource EMPTY>
<!ATTLIST   Resource
  Name CDATA #REQUIRED
  Version CDATA #REQUIRED
  Description CDATA #REQUIRED
  OSName CDATA #REQUIRED
  OSVersion CDATA #REQUIRED
  MaxMemorySize CDATA #REQUIRED
  MinMemorySize CDATA #REQUIRED
  MaxCPU CDATA #REQUIRED
  MinCPU CDATA #REQUIRED
  MaxSpeed CDATA #REQUIRED
  MinSpeed CDATA #REQUIRED
>
```

TABLE 1-continued

```
<!ELEMENT Security EMPTY>
<!ATTLIST   Security
  AuthenticationType CDATA #REQUIRED
  AuthenticationVersion CDATA #REQUIRED
  CAname CDATA #REQUIRED
  Certificate CDATA #REQUIRED
  SignatureData CDATA #REQUIRED
  AuthorizationLevel CDATA #REQUIRED
>
```

The application module code repository 614 stores the actual code for each of the applications 440.

Application module loader 612 provides the interface between the job scheduler 608 and application module code repository 614. In response to a request for a particular application 440, the application module loader 612 will find the code for the requested application 440 and provide it to the job scheduler 608 for distribution to the appropriate resources RS 506-524.

Critical and non-critical queues 604 and 606 are used for queuing sub-tasks corresponding to critical and non-critical modules, respectively.

Job scheduler 608 receives job requests from client 100 (and others (not shown)) for one or more applications 440 and manages the processing of the tasks associated with the job request using one or more resources RS 506-526. The interaction of job scheduler 608 with the application anatomy repository 610, application module loader 612, application module code repository 614, and critical and non-critical queues 604-606 is explained below in connection with FIGS. 8 and 9.

Figure 8:
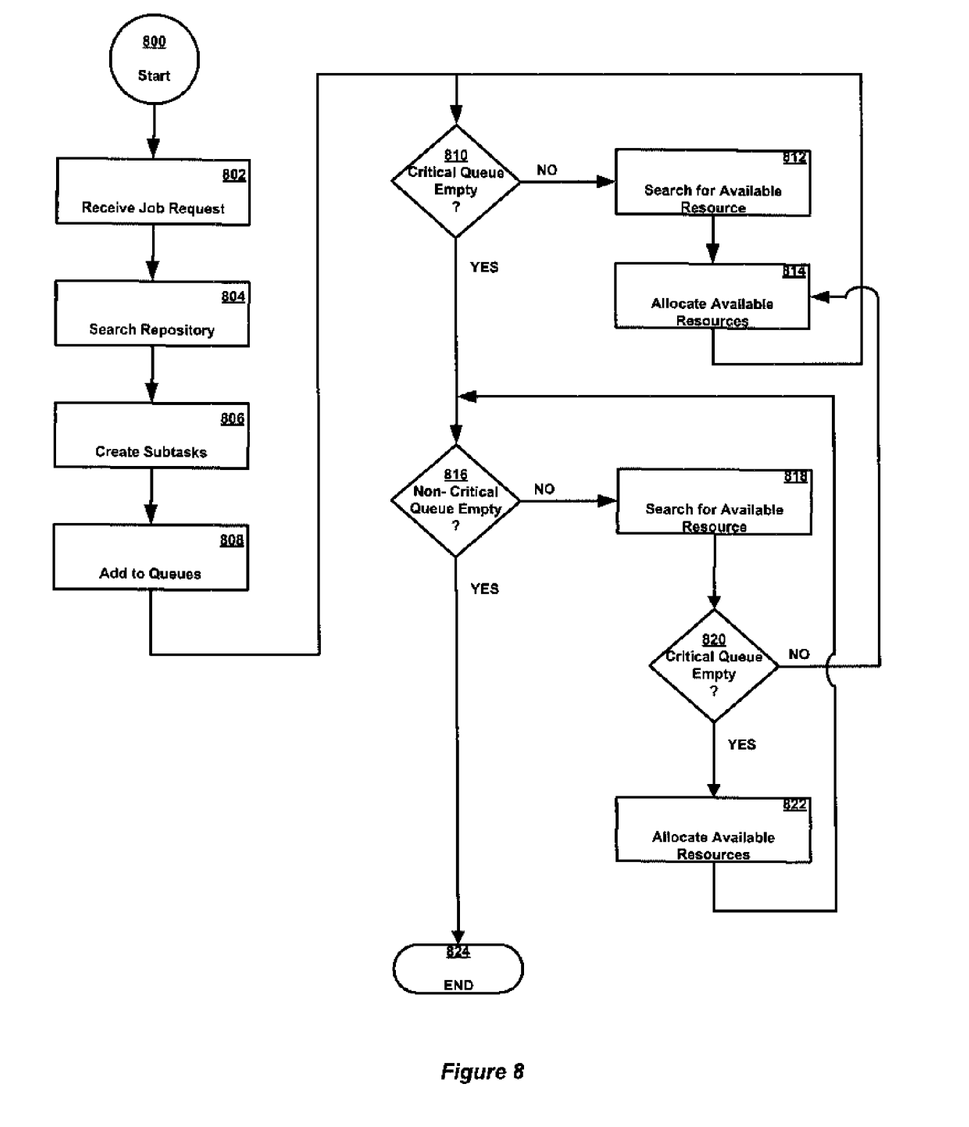
FIG. 8 is a flow chart diagram illustrating the method used by the job scheduler of FIG. 6 to process a job request from the client system according to the teachings of the present invention.

Reference now being made to FIG. 8, a flow chart is shown illustrating the method used by the job scheduler 608 of FIG. 6 to process a job request from client system 100 according to the teachings of the present invention. Upon receiving a job request from client system 100 for one of the applications 440, the job scheduler 608 searches the application anatomy repository 610 for the anatomy associated with the specified application 440 (steps 800-804). In this particular instance, it can be assumed that specified application 440 has the application anatomy 900 of FIG. 9.

Figure 9:
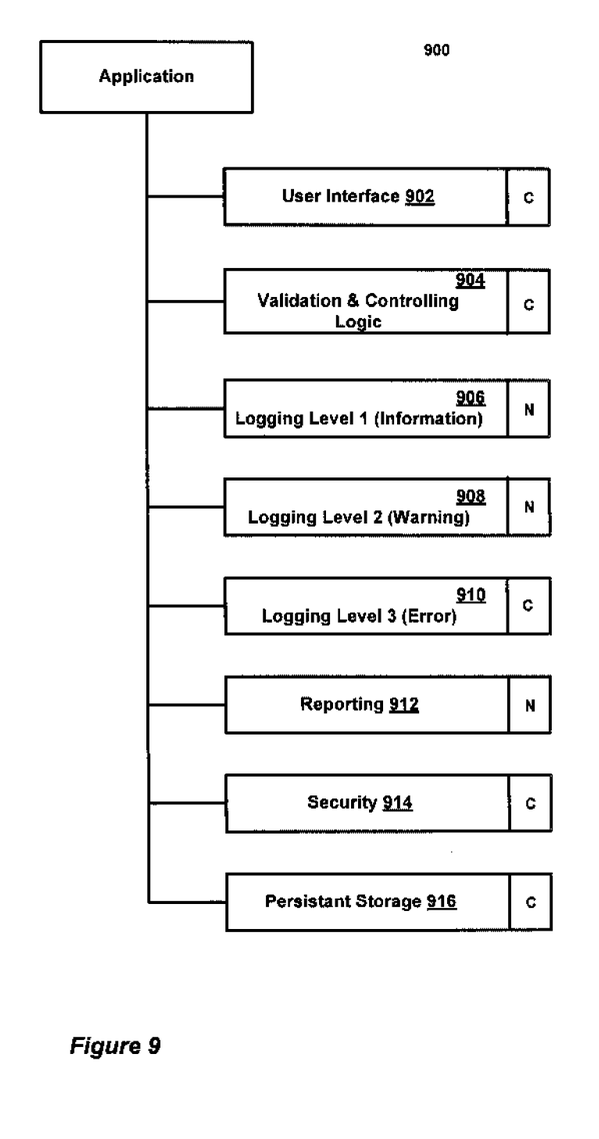
FIG. 9 is a diagram illustrating an example of the anatomy for one of the applications according to the teachings of the present invention.

Reference now being made to FIG. 9, a diagram of an example of the anatomy 900 for one of the applications 400 is shown according to the teachings of the present invention. The anatomy 900 includes modules 902-916. The user interface 902, validation and controlling logic 904, logging level 3 (error) 910, security 914 and persistent storage 916 modules are considered critical as indicated with the designation "C". The logging level 1 (information) 906, logging level 2 (warning) 908, and reporting 912 modules are considered non-critical as indicated with the designation "N".

Referring again to FIG. 8, the job scheduler 608 creates a sub-task for each one of the modules 902-916 storing those sub-tasks identified as critical (user interface 902, validation and controlling logic 904, logging level 3 910, security 914, and persistent storage 916) and non-critical (logging level 1 906, logging level 2 908, and reporting 912) into critical and non-critical queues 604 and 606, respectively (steps 806-808).

Job scheduler 608 then examines the critical queue 604 for any pending sub-tasks (step 810). In this particular instance, sub-tasks for the user interface 902, validation and controlling logic 904, logging level 3 (error) 910, and security 914 reside in the critical queue 604. If critical sub-tasks are pending, then job scheduler 608 searches for available resources RS 506-526 (Step 812). As resources RS 506-526 become available they are allocated for the pending critical sub-tasks before processing the non-critical sub-tasks (step 814). In this example, resources RS 506-516 are used for the pending critical sub-tasks. Part of the allocation includes instructing the application module loader 612 to retrieve the code for each of the processed critical sub-tasks from the application module code repository and sending the code to the appropriate resource 506-522.

Once there are no pending critical sub-tasks, the job scheduler 608 examines the non-critical queue 606 for any pending sub-tasks (step 816). In this instance, non-critical sub-tasks exist for logging level 1 (informational) 906, logging level 2 (warning) 908, and reporting 912 modules.

If non-critical sub-tasks are pending, then the job scheduler 608 searches for available resources RS 506-526 (step 818). In this instance, resources 522-526 are available. As resources RS 506-526 become available, the job scheduler 608 examines the critical queue 604 to ensure that no new critical sub-tasks have been created (e.g., in response to another job request) (step 820). If the critical queue 604 is occupied, then the job scheduler 608 proceeds to allocate the available resources for the pending critical sub-tasks as previously discussed (Step 814).

If, however, no new critical sub-tasks have been created while processing the non-critical sub-tasks, then the job scheduler 608 allocates these available resources to the pending non-critical tasks using the application module loader 612 as previously discussed (step 822).

If there are no pending critical or non-critical sub-tasks then the method proceeds to end (step 824).

Job scheduler 608 is also capable of re-allocating resources in response to a failure or when the resources RS 506-526 become constrained and there are critical sub-tasks pending in the critical queue 604 as explained in connection with FIG. 10.

Figure 10:
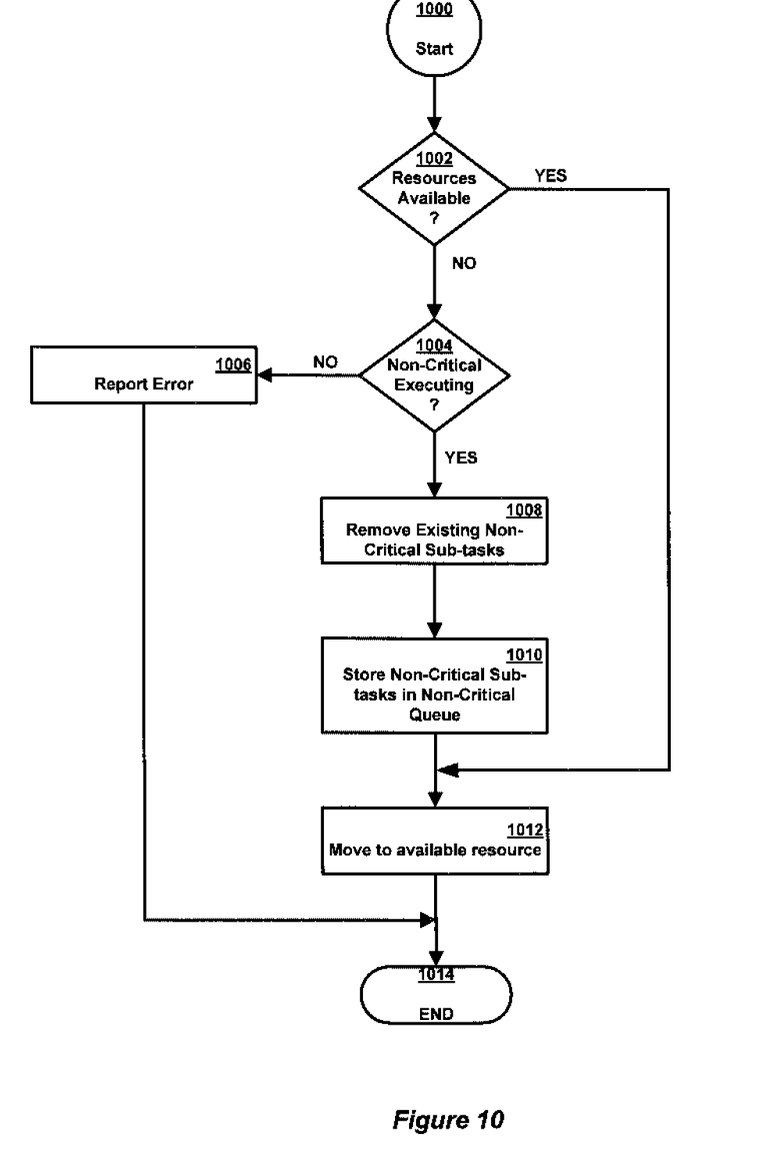
FIG. 10 is a flow chart illustrating the method used by the job scheduler of FIG. 6 to re-allocate resources as they become constrained according to the teachings of the present invention.

Reference now being made to FIG. 10, a flow chart is shown illustrating the method used by the job scheduler 608 of FIG. 6 to re-allocate resources as they become constrained according to the teachings of the present invention. In this example, it can be assumed that the resources RS 506-526 have been allocated to execute the sub-tasks associated with the application 800 of FIG. 9 as previously explained in connection with FIG. 8. In other words, RS 506-516 are executing sub-tasks associated with modules 902, 904, 910, and 914, respectively, and RS 522-526 are executing sub-tasks associated with modules 906, 908, and 912, respectively.

Certain events such as a node failure or a new job request having critical modules for execution can result in the job scheduler 608 being required to re-allocate resources RS506-526. In the preferred embodiment of the present invention, each job requests can be assigned a priority. Depending upon this priority, the currently executing job request can be completely replaced or operated in a degraded state by removing its non-critical sub-tasks. The job scheduler 608 can be configurable to make these and similar decisions associated with having a prioritization scheme.

For the moment, we can assume that a node failure has occurred resulting in resource RS 512 failing to execute the sub-task associated with module logging level 3 (error) 810 to cease execution (step 1000).

In response, the job scheduler 608 examines resources RS 506-528 to see if any of them are executing non-critical sub-tasks (step 1004). If all of the resources RS 506-528 are executing critical sub-tasks, then the job scheduler 608 returns an error to the client system 100 (steps 1006 and 1014). In this example, RS 522-526 are executing non-critical sub-tasks for modules 906, 908, and 912, respectively.

If there are resources RS 506-526 that are executing non-critical sub-tasks, then the job scheduler 608 removes one of these non-critical subtasks and places it back into the non-critical queue 608 for processing (steps 1008 and 1010). In this example, sub-task executing on resource RS 524 for module 906 is removed and placed back into the non-critical queue 606.

The job scheduler 608 then allocates the resource RS 524 for the critical sub-task that was either retrieved from being stored in the critical queue 604 or executing on a failed node. In this example, the critical sub-task associated with module 910 is moved from resource RS 512 to resource RS 524 (Step 1012). The job scheduler 608 marks the application 900 as executing in a degraded state and provides this information to client system 100.

It is thus believed that the operation and construction of the present invention will be apparent from the foregoing description. While the method and system shown and described has been characterized as being preferred, it will be readily apparent that various changes and/or modifications could be made without departing from the spirit and scope of the present invention as defined in the following claims.

What is claimed is:

1. A method of executing an application, the method comprising the steps of:
a computer receiving a request to utilize the application to perform a first, primary function of the application, and in response retrieving a sub-task that requires the first, primary function for completion, wherein the sub-task is retrieved from a critical queue in response to receiving the request to utilize the application to perform the first, primary function of the application, the computer executing the application to perform the request, and in response, the computer detecting that a response time of the application to perform the request is slower than a predetermined threshold, and in response, the computer determining that (a) the slow response time is due to overload of a hardware resource used by the application to perform the first function, and (b) a second, secondary function of the application also uses the hardware resources, and in response, the computer suspending execution of a program module within the application that performs the second function to free up the hardware resource for use by an other program module within the application that performs the first function.

2. The method of claim 1, wherein the hardware resource is an infrastructure, and the overload of the hardware resource used by the application to perform the first function comprises the infrastructure dropping.

3. The method of claim 1, wherein the overload of the hardware resource comprises the hardware resource failing.

4. The method of claim 1, wherein the step of the computer receiving the request to utilize the application further comprises receiving the request from a second computer system; and, the computer transmitting information that the application performs in a degraded state to the second computer system in response to the computer suspending execution of the program module.

5. A computer program product for executing an application,
the computer program product comprising:
a computer readable storage device having computer readable program code stored thereon, the computer readable program code comprising:
computer usable program code configured to receive a request to utilize the application to perform a first, primary function of the application, and retrieve a sub-task that requires the first, primary function for completion, wherein the sub-task is retrieved from a critical queue in response to receiving the request to utilize the application to perform the first, primary function of the application;
computer usable program code configured to execute the application to perform the request, in response to receiving the request to utilize the application to perform the first, primary function of the application, and in response,
computer usable program code configured to detect that a response time of the application to perform the request is slower than a predetermined threshold, and in response, computer usable program code configured to determine that (a) the slow response time is due to overload of a hardware resource used by the application to perform the first function, and (b) a second, secondary function of the application also uses the hardware resources, and in response,
computer usable program code configured to suspend execution of a program module within the application that performs the second function to free up the hardware resource for use by an other program module within the application that performs the first function.

6. The computer program product of claim 5, wherein the hardware resource is an infrastructure, and the overload of the hardware resource used by the application to perform the first function comprises the infrastructure dropping.

7. The computer program product of claim 5, wherein the overload of the hardware resource comprises the hardware resource failing.

8. The computer program product of claim 5, wherein the computer usable program code configured to receive the request to utilize the application further comprises:
computer usable program code configured to receive the request from a second computer system; and
computer usable program code configured to transmit information that the application performs in a degraded state to the second computer system in response to computer usable program code configured to suspend execution of the program module.

9. A data processing system for executing an application, the data processing system comprising:
a processor, a computer readable memory and a computer usable storage device, wherein the processor executes the computer usable program code to receive a request to utilize the application to perform a first, primary function of the application, and in response, retrieve a sub-task that requires the first, primary function for completion, wherein the sub-task is retrieved from a critical queue in response to receiving the request to utilize the application to perform the first, primary function of the application, execute the application to perform the request, and in response, detect that a response time of the application to perform the request is slower than a predetermined threshold, and in response, determine that (a) the slow response time is due to overload of a hardware resource used by the application to perform the first function, and (b) a second, secondary function of the application also uses the hardware resources, and in response, suspend execution of a program module within the application that performs the second function to free up the hardware resource for use by an other program module within the application that performs the first function.

10. The data processing system of claim 9, wherein the hardware resource is an infrastructure, and the overload of the hardware resource used by the application to perform the first function comprises the infrastructure dropping.

11. The data processing system of claim 9, wherein the overload of the hardware resource comprises the hardware resource failing.

12. The data processing system of claim 9, wherein in executing computer usable program code to receive the request to utilize the application the processor further executes the computer usable program code to receive the request from a second computer system; and, transmit information that the application performs in a degraded state to the second computer system in response to suspend execution of the program module.

* * * * *